United States Patent [19]

Rust et al.

[11] Patent Number: 4,825,054

[45] Date of Patent: Apr. 25, 1989

[54] METHOD AND APPARATUS FOR PARALLEL INTEGRATED CIRCUIT CARD INITIALIZATION AND EMBOSSING

[75] Inventors: Jeffrey J. Rust, Brooklyn Park; Rodney J. LeVasseur, Lakeville; Alan Meilach, Prior Lake; Brian Beech, Bloomington; Richard M. Wetzel, Plymouth; Eric J. Freudenheim, Burnsville, all of Minn.

[73] Assignee: DataCard Corporation, Minnetonka, Minn.

[21] Appl. No.: 156,351

[22] Filed: Feb. 16, 1988

[51] Int. Cl.$^4$ .................. G06K 1/00; G06K 19/06
[52] U.S. Cl. ..................... 235/380; 235/492; 235/488; 235/481; 235/441; 902/29; 364/468
[58] Field of Search .............. 235/375, 379, 380, 441, 235/487, 488, 492, 475, 476, 481, 439, 449; 283/904; 902/26, 29; 364/400, 401, 408, 468, 478, 490; 365/189, 220, 244

[56] References Cited

U.S. PATENT DOCUMENTS

| | | |
|---|---|---|
| 4,106,062 | 8/1978 | Foote .................. 235/449 |
| 4,518,853 | 5/1985 | Gabel et al. .......... 902/29 |
| 4,614,861 | 9/1986 | Pavlov ................. 235/380 |
| 4,617,216 | 10/1986 | Haghiri-Tehrani et al. ....... 283/904 |
| 4,688,785 | 8/1987 | Nubson et al. ........ 271/266 |
| 4,701,600 | 10/1987 | Beech et al. ......... 235/492 |
| 4,709,136 | 11/1987 | Watanabe ............. 235/379 |
| 4,772,782 | 9/1988 | Nonat .................. 235/492 |
| 4,778,982 | 10/1988 | Beech et al. ......... 235/375 |

FOREIGN PATENT DOCUMENTS 2091638  8/1982  United Kingdom .............. 902/29

OTHER PUBLICATIONS

"Away to Personalize Cards 10 Times Faster", author unknown, undated.

Primary Examiner—Alan Faber
Assistant Examiner—Robert A. Weinhardt
Attorney, Agent, or Firm—Merchant, Gould, Smith, Edell, Welter & Schmidt

[57] ABSTRACT

The present invention provides a method and apparatus for parallel initialization of integrated circuit cards along a card transfer path.

7 Claims, 7 Drawing Sheets

METHOD AND APPARATUS FOR PARALLEL INTEGRATED CIRCUIT CARD INITIALIZATION AND EMBOSSING

BACKGROUND OF THE INVENTION

The present invention relates to a method and apparatus for integrated circuit card initialization and embossing.

Integrated circuit cards (ICCs) are thin cards which have embedded therein an integrated circuit including a microprocessor and/or associated memory which can be accessed through contacts on the surface of the card so as to allow programming of the integrated circuit card's memory; i.e., reading and writing of information from and to the ICC memory. Integrated circuit cards can be customized for use by individuals. An example of one application of such cards are credit cards. Typically, the microprocessor contacts are flush with the surface of the card so that data may be entered, altered, and retrieved from memory. In programming the integrated circuit card, also referred to as initializing, personalized data unique to an individual and application-related data is entered into the microprocessor memory. Personalized data might include name, address, PIN, etc. Application data will relate to the intended use of the card and the card vendor's specifications. Various systems and apparatus for initializing integrated circuit cards are known; see for example, U.S. Pat. No. 4,701,600, hereby incorporated by reference. Although not required, integrated circuit cards typically have corresponding data transferred to the card by other methods, such as embossed on the card and/or encoded on a magnetic stripe on the card. Methods and apparatus for such types of traditional data transfer are well-known, as evidenced by U.S. Pat. No. 4,688,785 and U.S. Pat. No. 4,518,853, both of which are hereby incorporated by reference. Conventional embossing and magnetic stripe encoding machines have a plurality of stations, also referred to as modules, performing the embossing and magnetic stripe encoding. Each embossing module will typically emboss only a single line of information.

The initialization process is typically slower than traditional embossing or magnetic strip recording processes; e.g., the initializing process may take twenty seconds or more, whereas embossing of a single line of data and magnetic stripe encoding might each take two or three seconds. To accomplish both types of processes, the integrated circuit cards are first initialized at one machine. The initialized cards are then embossed, magnetic stripe encoded, etc. at another machine. Since initialization typically requires a longer period of time than the embossing or recording to magnetic strip process, preparing integrated circuit cards with both initialized and embossed or magnetic stripe data is a very time consuming process. Additionally, there is the problem of maintaining proper correlation between the cards when transferring the initialized cards from one machine to another. For example, if the cards are misplaced between the initialization process and the embossing, etc. process, this creates a problem in maintaining proper correlation of the data.

The present invention solves these and other problems.

SUMMARY OF THE INVENTION

The present invention relates to a method and apparatus for initializing integrated circuit cards (ICCs) in parallel.

A particular advantage of the invention is the overall reduction in time required to both initialize and emboss, etc. an integrated circuit card.

Yet another substantial advantage of the present invention is the ability to more accurately correlate initialization data with traditional types of data transfer to cards, such as embossing, magnetic stripe encoding, etc.

In one embodiment of the present invention, integrated circuit card intialization occurs at the integrated circuit card embossing, magnetic stripe, etc. stations.

An advantage of one embodiment of the invention is the use of an intelligent, integrated circuit programming modlue (ICPM) which performs the initializing of the integrated circuit cards. The ICPM is electrically interconnected to a system controller for transferring information between the ICPM and the system controller.

In the preferred embodiment, there is one ICPM for each integrated circuit card.

These and various other advantages and features of novelty which characterize the present invention are pointed out with particularity in the claims annexed hereto and forming a part hereof. However, for a better understanding of the invention, its advantages and objects obtained by its use, reference should be had to the drawings which form a further part hereof, and to the accompanying descriptive matter in which there is illustrated and described a preferred embodiment of the invention.

BRIEF DESCRIPTION OF THE DRAWINGS

In the drawings, in which like reference numerals indicate corresponding parts throughout.

DETAILED DESCRIPTION OF THE PREFERRED EMBODIMENT

Figure 1:
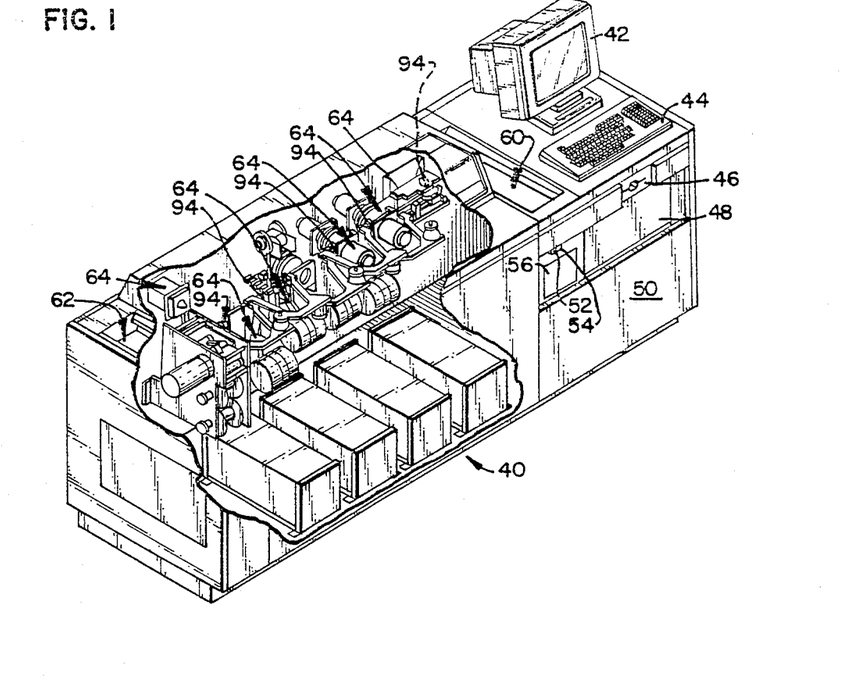
FIG. 1 is a perspective view of an embodiment of an integrated circuit card processing system in accordance with the principles of the present invention.

Referring now to FIG. 1, there is illustrated an integrated circuit card (ICC) processing system for both initializing integrated circuit cards and transferring data to the integrated circuit cards by various conventional methods such as embossing, encoding to magnetic stripe, indent printing, etc., the card processing system being generally referenced by the reference numeral 40. In the system 40 illustrated, there is provided a CRT display 42 for display of system information, a keyboard 44 for operator input, a disk drive unit 46 for loading in unique personalization and application data from a floppy diskette and/or hard disk media, or other recording media, a magnetic tape deck 48 for storage of information, a system control cabinet 50 enclosing a system controller (not shown in FIG. 1) which controls operation of the system. The system controller might include a microprocessor system such as an Intel 80286 microprocessor and associated memory, interface drivers, etc. In addition, the system 40 is illustrated as including a power on reset switch 52, a power off switch 54, and a meter panel 56 illustrating operation time and number of cards processed. An integrated circuit card transfer path along the system begins at an input hopper 60 and ends at an output stacker 62. Integrated circuit cards are placed in the input hopper and then serially fed along the card transfer path at spaced intervals past several stations 64, also referred to as modules, which comprise the system. In the system shown, the card processing system 40 includes a magnetic stripe encoding module, an optical character recognition (OCR) embossing module, an alpha-numeric (A/N) embossing module, an indent printing module, a heavy duty (H/D) embossing module, a card transfer path module, and a topper module which applied a topping layer. It will be appreciated that any number and variety of modules might be present.

Figure 2:
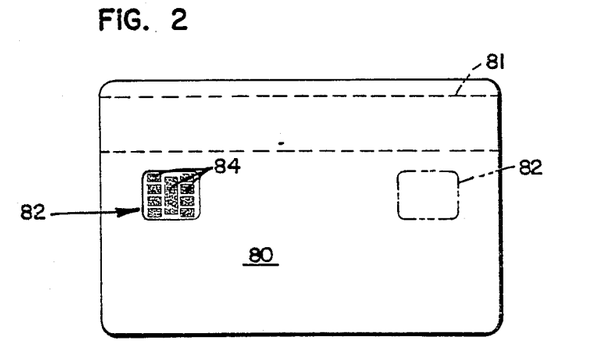
FIG. 2 is a pictorial view of an integrated circuit card illustrating microprocessor contacts.

As illustrated in FIG. 2, wherein an integrated circuit card 80 is shown, the integrated circuit card 80 will include an integrated circuit 82 including a microprocessor and associated memory which is embedded in the card 80. An alternate location of the integrated circuit 82 is shown in phantom line in FIG. 2. A plurality of contacts 84 typically flush with the surface of the card allow data to be read into and read out of the integrated circuit card 80 both during the initialization process at the card processing system 40 and when in use. The contacts 84 on the card may be located on the front face or rear of the card. That is, the contacts may be located on the side of the card where the characters are raised during the embossing process (front face) or on the side of the card opposite from which the characters are raised and where typically a magnetic strip appears (rear face). In FIG. 2, a magnetic stripe 81 is shown in broken line as it appears on the rear face of the integrated circuit card 80 shown. On some cards, the magnetic stripe 81 may appear on the front face.

Figure 3:
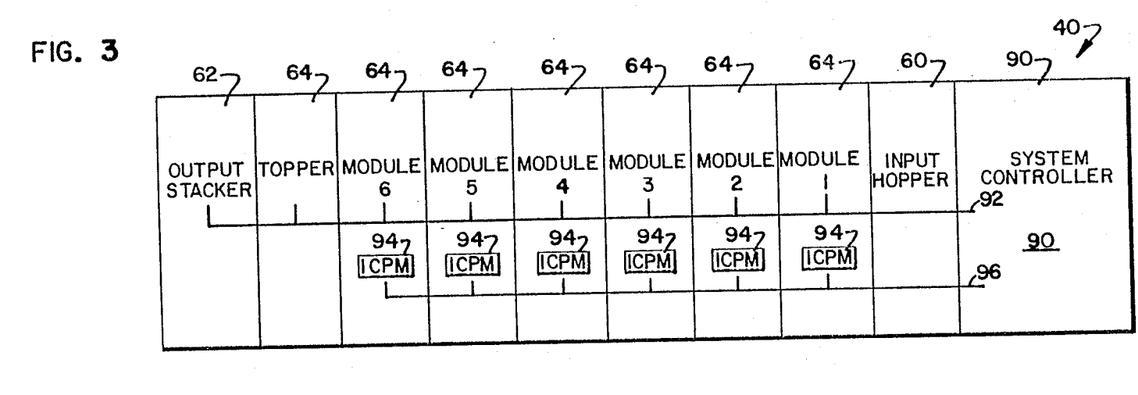
FIG. 3 is a block diagram of an embodiment in accordance with the principles of the present invention, illustrating positioning of integrated circuit programming modules (ICPMs) at the data transfer stations.
Figure 4:
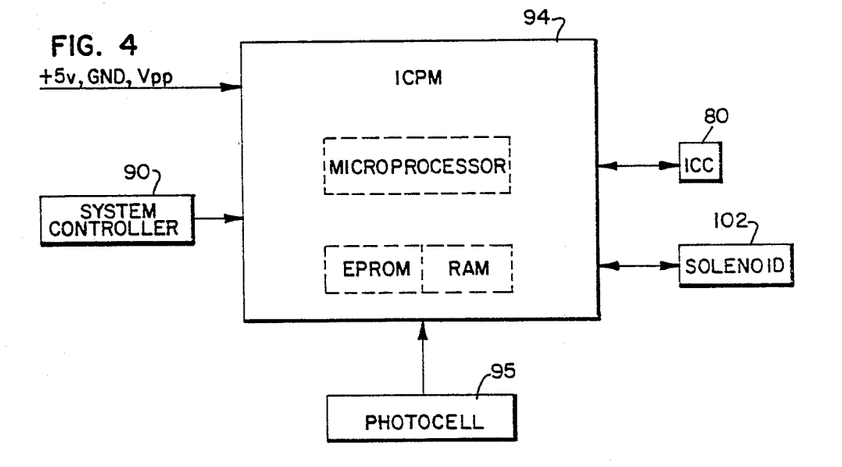
FIG. 4 is a block diagram of an embodiment of an ICPM.

Illustrated in FIG. 3 is a block diagram of the modular arrangement of the card processing system 40 shown in FIG. 1. As illustrated, each of the modules 64 are interconnected to the system controller, referenced by the reference numeral 90, by an electrical bus 92 for transfer of electrical control signals and information. In addition, each of the modules 64, with the exception of the topping module, includes suitably mounted thereon an integrated circuit programming module (ICPM) 94 which is likewise interconnected to the controller 90 by an electrical bus 96 for transfer of electrical signals and information. The intelligent integrated circuit programming modules 94 control initialization of the integrated circuit cards, also referred to as programming, at each of the modules. As illustrated in FIG. 4, an embodiment of the ICPM 94 might include an 8031 microprocessor, RAM and EPROM memory, solenoid interface, photocell sensor interface, system controller interface, power interface, and ICC interface. The ICPMs will include appropriate interface drivers for controlling input/output on these interfaces. The standard ICPM interface functions are run from EPROM memory. RAM memory is provided in the ICPM to contain a variable code dependent on card type and the card's application, which is downloaded from the system controller 90. In addition, personalized data unique for each card is downloaded from the system controller 90 into RAM of the ICPM. After the variable code and personalized data have been downloaded from the system controller 90, the ICPM performs the initialization process independent of the system controller 90. The photo sensor port and solenoid driver allows the ICPM to sense the presence of a card and place an integrated circuit card head initializer mechanism 100, also referred to as a programming head mechanism, on the integrated circuit card in contact with the contacts 84. Typically, six lines are required as follows for the integrated circuit card (ICC) interface:

I/O—Data input/output
Vcc—+5 volt power
Reset—card reset
Clk—Clock
Vpp—Programming voltage
Gnd—Ground reference In addition, the power interface provides for input of +5 volts, ground, and programming voltage Vpp. It will be appreciated that the ICPM might include its own internal power supply. It will further be appreciated that the ICPM 94 and the system controller may take on any number of different configurations in keeping with the principles of the present invention.

The card processing system 40 has two modes of operation, card processing and integrated circuit card initialization. Card processing is defined to include all functions presently performed to personalize the cards such as picking the cards from the input hopper 60, magnetic stripe encoding at the magnetic stripe encoding module, embossing at the embossing modules, indenting at the indent printing modules, topping at the topping module, transferring the cards along the transfer path at the transfer module, and stacking in the output stacker 62. The integrated circuit card initialization is defined as all processes required to personalize the data in the memory of the integrated circuit 82 embedded in the integrated circuit card 80, that is, engage the contacts 84 on the surface of the integrated circuit card, perform communication handshaking between the integrated circuit 82 and the integrated circuit programming modules 94, writing data from the integrated circuit processing modules 94 to the integrated circuit 82 of the integrated circuit card 80, and disengaging the contacts 84. Likewise, data can be read by the ICPMs from the integrated circuit cards. The integrated circuit card initialization is accomplished by use of the multiple ICPMs in parallel, thereby increasing throughput over serial initialization; i.e., initialization of one card at a time.

The card processing is performed by the card processing system 40 in cycles. During each cycle, the appropriate customized information is sent to each of the modules 64 for processing and the integrated circuit cards 80 are serially moved from one module to another along the card transfer path. For example, a line of embossing information or magnetic stripe encoding information is sent to the appropriate modules. When the sixth module or last module with an integrated citcuit processing module 94 contains a card which has not been initialized by the integrated circuit processing module (ICPMs) 94, the card processing system 40 changes modes. Card processing is halted and the integrated circuit cards are suitably positioned for engagement with an integrated circuit card head initializer mechanism 100, also referred to as a programming head mechanism 100, associated with each of the modules. (Illustrated in FIG. 5-8 is an embodiment of the head initializer mechanism 100.) The integrated circuit card initialization begins by the integrated circuit processing module casuging a rotary solenoid 102 and its associated linkage 104 to position the integrated circuit card head initializer mechanism 100 proximate the integrated circuit card 80 such that electrical contacts 106 of the integrated circuit card head intializer mechanism 100 engage the contacts 84 of the integrated circuit card. The integrated circuit programming module 94 then performs the suitable handshaking (answer to reset) required to initiate communication with the integrated circuit 82 and then reads and/or writes personalization data to the integrated circuit card's memory. Integrated circuit card information such as pin identifier number (PIN) or card manufacturer's data is sent by the integrated circuit programming module 94 back to the system controller 90 and stored on the hard disk 48. The initialization process occurs simultaneously or in parallel for all six modules. When the initialization process is completed, the integrated circuit card head initializer mechanism 100 are retracted and control is then performed. Upon completion of the next six card cycles, control is again passed to the integrated circuit programming modules 94 for intialization of the integrated circuit cards.

Overall control of the card processing system 40 is maintained by the system controller 90. The system controller 90 is responsible for controlling and sending information to the respective modules. However, since the integrated circuit programming modules 94 control initialization of the integrated circuit cards 80, the system controller 90 places the card processing system 40 in an idle state while the integrated circuit card initialization is being performed by the ICPMs 94. Error recovery procedures are provided to allow the additional integrated circuit card initialization operation.

Since the ICPMs 94 perform the integrated circuit card initialization, standard code for programming the integrated circuit card is contained in the EPROM of the ICPM 94. Variable code for integrated circuit card type and application are downloaded into RAM of the ICPM 94 from the system controller 90. This allows for easy adoption of the ICPMs to new applications and different vendor's cards. An application program may be loaded into the system controller by a diskette and then downloaded to the ICPMs and multiple applications may be stored on a hard disk in the system. The card type and application program is sent once from the system controller 90 to the ICPMs 94, typically at system start-up, while the personalized data is sent from the system controller 90 to the ICPMs 94 before, or at the beginning of, each card initialization mode.

The application code sent to the ICPMs defines how the integrated circuit card is to be personalized. The application code defines where and how the data is to be written to the integrated circuit card; e.g., the application code defines both the integrated circuit card interface and the format of the customer's data input. The application code also defines if information is to be read from the card and returned to the system controller 90 for future reference.

In general, the card processing system is capable of reading and writing data to and from the integrated circuit cards. A key, also referred to as a code, may be entered in through the keyboard to unlock the integrated circuit card for personalization. Data read from the integrated circuit card may be stored on hard disk for future retrieval and/or sent to a host. In one embodiment, the system is designed to handle a maximum of 8 kilobytes of integrated circuit card data.

Figure 9:
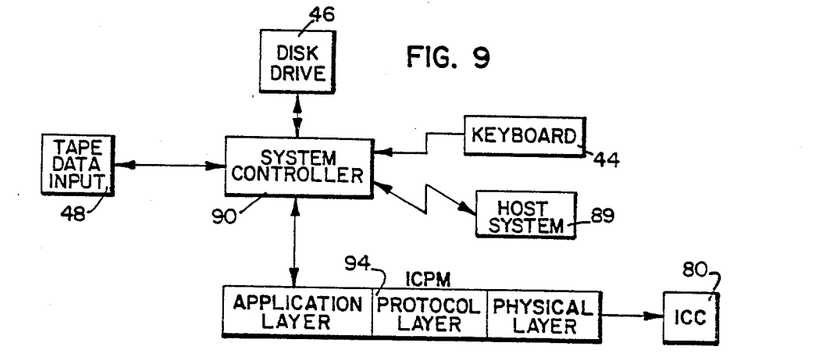
FIG. 9 is a block diagram of information flow between the System Controller, Integrated Circuit Programming Modules, and Integrated Circuit Card.

During a card processing run, the system controller 90 will typically send the integrated circuit card field from the tape directly to the ICPMs without modification. The controller may also manipulate the data before sending it to the ICPMs; e.g., restructure the date, perform encryption algorithms, etc. Integrated circuit card personalization by the ICPMs 94 is divided into two areas. The first process configures the system to accept the data. The second process writes and reads the data to the integrated circuit card. An illustration of overall card processing system flow is shown in FIG. 9. The ICPMs are programmed to accept the specific integrated circuit card interface and customer's data input format. This is accomplished by use of an application program which is loded into the system controller 90 from a floppy disk or hard disk. The application program is transferred to the ICPMs when the system is initializing the modules during power up. Multiple applications may be developed and loaded in from diskettes.

During card production, the controller reads personalized data in from media such as tape, floppy diskette, hard disk, from a host system 89, or from a keyboard input device. The personalized data is transferred to the appropriate embossing, magnetic stripe encoding, etc. modules 64. The data is also transferred to the appropriate ICPMs 94. The personalized data, after being received at the ICPMs, passes through generally three layers of processing in the ICPM. The application layer, the protocol layer, and the physical layer make up the three layers. Each layer or process defines how the data is to be written to the integrated circuit card. The application layer defines where the data read in from tape is to be written to in the integrated circuit card. It is also responsible for requesting any data from the card. Data handling applications such as data encryption or compaction may take place in the ICPM or the system controller 90. The application layer passes the data to the protocol layer. The protocol layer is configured for the particular card vendor. This layer configures the data in the format for the integrated circuit card. Error detection and recovery is handled in this layer. The protocol layer passes the data to the physical layer. The physical layer contains the hand-shaking and single levels to communicate with the card. The standard ISO proposal is used in this embodiment as the base for this design.

The integrated circuit card 80 information stored at the system controller 90 during integrated circuit card processing may be transferred to a floppy disk in the disk drive unit 46 at the end of a run. This data may then be transferred to another device for processing. It will be appreciated that the present invention is capable of running as a standard card processing system without the integrated circuit card initialization. In addition, the system might be used for integrated circuit card initialization exclusively with the same throughput as if card processing was included.

Figure 5:
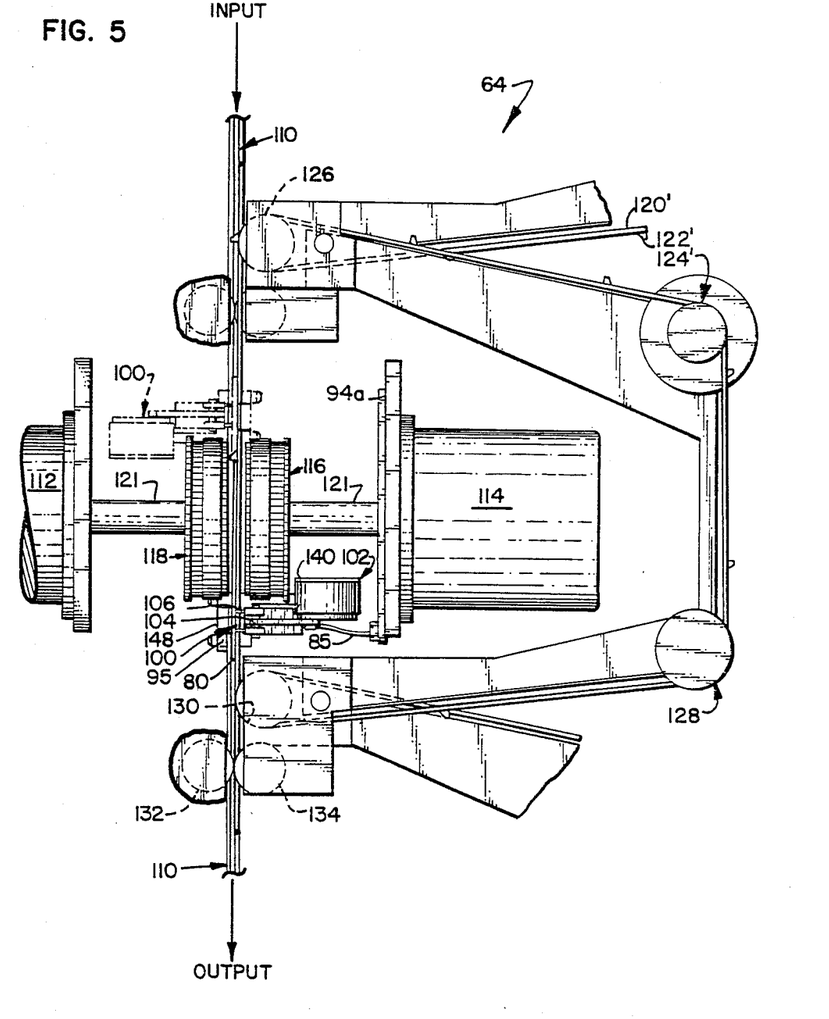
FIG. 5 is a top plan view of an embodiment of an embossing mechanism, initializing mechanism, and card transport mechanism for a single station, also referred to as a module, of a card processing system as generally illustrated in FIG. 1.
Figure 6:
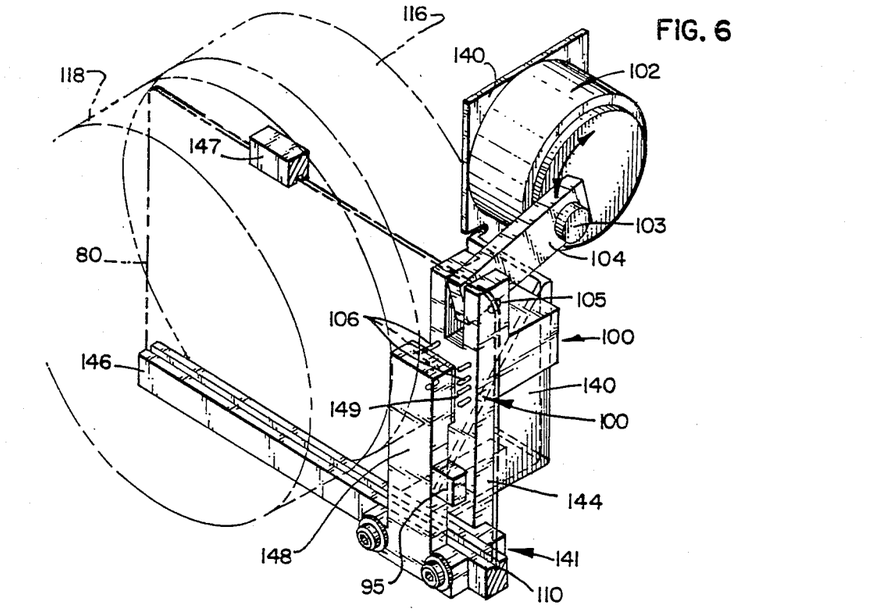
FIG. 6 is a partial perspective view of an embodiment of a integrated circuit card head initializer mechanism, also referred to as a programming head mechanism, and its associated solenoid drive linkage.

As previously discussed, methods and apparatus for initializing data on an integrated circuit card are known. U.S. Pat. No. 4,701,600, thereby incorporated by reference, discloses such a method and apparatus. In addition, methods are embossing and magnetic stripe encoding are known. For example, see U.S. Pat. Nos. 4,688,785 and 4,518,853, both of which are hereby incorporated by reference. The integrated circuit processing module 94 and its associated integrated circuit card head initializer mechanism 100 is suitably mounted in each of the modules 64. One embodiment of a mounting arrangement will now be discussed. The integrated circuit card head initializer mechanism 100 must be mounted on the rear or front side of the card transport track 110 depending on whether the integrated circuit contacts 84 are located on the rear or front side of the integrate circuit card. In addition, a card detection sensor, such as a photocell 95, is suitably mounted along the card transport track depending on which side of the card transport track the integrated circuit card head initializer mechanism 100 is located. Illustrated in FIGS. 5 through 8 is an embodiment of an arrangement for mounting the integrated circuit card head initializer mechanism 100 along the card transport track 110. In this illustration, the integrated circuit card head initializer mechanism 100 is mounted at an embossing module 64 such as shown in U.S. Pat. No. 4,688,785. It wil be appreciated that the integrated circuit card head initializer mechanism 100 may be mounted in various other ways at varying modules depending on the configuration and space limitations of that module. In FIG. 5, the embossing module is shown as including drive motors 112, 114 interconnected to embossing wheels 116, 118 by suitable drive shafts 121. An integrated circuit card 80 is illustrated in position for initialization. The integrated circuit card 80 is moved for various positions relative to the embossing wheels 116, 118 by a belt 120 having a series of projections or spurs 122 projecting outwardly therefrom as the belt 120 is moved by a motor 124 around pulleys 126, 128 and 130. Belt 120' and projection 122' are a part of the card transport path 110 which precedes the embossing module shown in FIG. 5, where the belt 120 traverses a path driven by the motor 124 around the pulleys 126, 128, and 130. The control of the motor 124 is accomplished by well-known servo circuitry not specifically shown. The motor 124 is a stepper motor which moves the belt 120 in increments having an angular displacement sufficient to move the belt 120 one character position along the card path. Drive rollers 132, 134 provide an integrated circuit card in the nip of the rollers with a slightly higher speed than the speed of the integrated circuit card as the belt 120 is advanced in normal indexing mode, such that the drive rollers 132, 134 pull a trailing edge of the integrated circuit card 80 away to clear the projection 122 as the belt 120 travels over roller 130. Although not shown, the rollers 132, 134 may be conveniently driven by a belt drive from the pulley 130 with the relative diameters of the rollers 132, 134 being selected to give a linear speed as desired.

Figure 7:
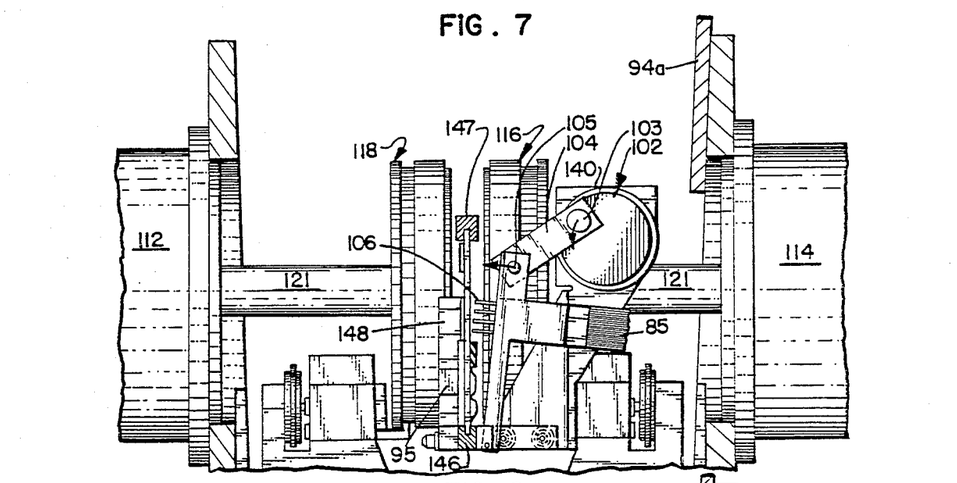
FIG. 7 is a side view of the embodiment shown in FIG. 6.
Figure 8:
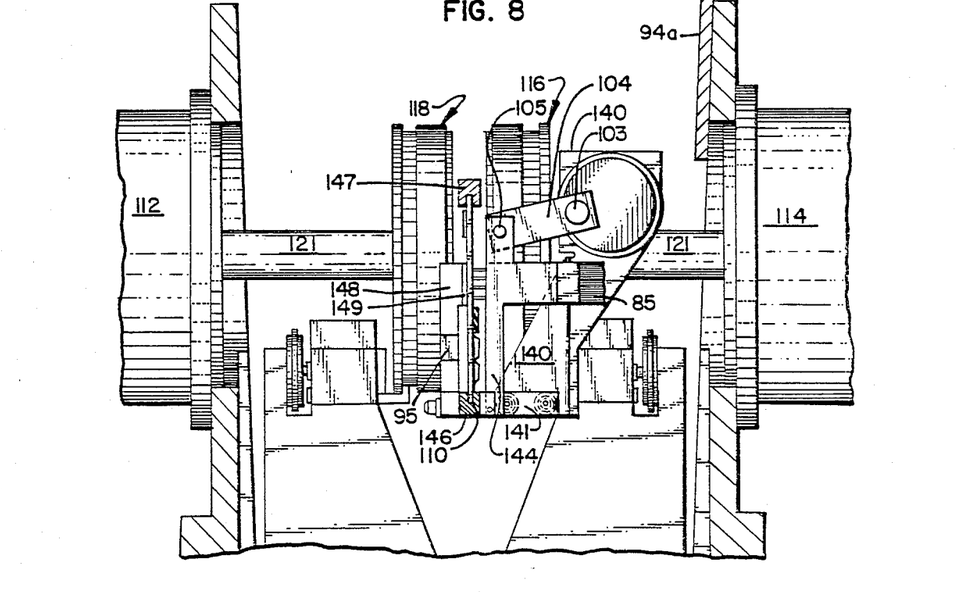
FIG. 8 is a side view of the embodiment shown in FIG. 6 with the integrated circuit card head initializer mechanism in the initializing position engaging the contacts of the integrated circuit card.

The integrated circuit card head initializer mechanism 100 is pivotally interconnected at 105 to the end of the movable solenoid linkage 104 which is pivotally interconnected at 103 to the rotary solenoid 102. A bracket 140 secures the solenoid 102 to the card transfer path 110 via a structure 141 attached to a bottom card rail 146. The integrated circuit card head initializer mechanism 100 is pivotally interconnected by a support structure 144 to proximate the bottom card rail 146 of the card transport path 110 via the structure 141. The support structure is mounted for pivotal movement about an axis generally parallel to the card transfer path 110. As illustrated in FIGS. 7 and 8, upon actuation of the rotary solenoid 102, the solenoid shaft rotates, thereby causing movement of the integrated circuit card head initializer mechanism 100. The integrated circuit card head initializer mechanism 100 is alternately pivoted between an integrated circuit card non-initializing position as shown in FIG. 7 and an initializing position as shown in FIG. 8. In the initializing position, the contacts 106 of the integrated circuit card head initializer mechanism 100 engage the contacts 84 of the integrated circuit card. It is, at this point, that the integrated circuit card initialization mode of operation occurs. Upon completion of the integrated circuit card initialization, the integrated circuit card head initializer mechanism 100 is retracted into the non-initializing position so as to allow clearance between the contacts 106 and the integrated circuit card 80. At this point in time, the card processing operation occurs. Immediately opposite of the integrated circuit card head initializer mechanism 100 is a support structure 148 which restricts movement of the integrated circuit card 80 away from the contacts 106 when engagement occurs with the contacts 84. The support structure 148 might include a Teflon ® layer 149 so as to not damage the card. A ribbon cable 85 is illustrated as interconnecting the initializer mechanism 100 to the ICPM 94 which is mounted on a circuit board 94a attached to the drive motor structure.

As illustrated in FIG. 5, the integrated circuit card head initializer mechanism 100 might also be disposed on an opposite side of the card transfer path 110 as illustrated in phantom line. It will be appreciated that the method and apparatus of mounting the integrated circuit card head initializer mechanism proximate the card transport path 110 may take on numerous configurations and still be in keeping with the principles of the invention. For example, as opposed to a pivotally mounted integrated circuit card head initializer mechanism which is activated by a rotary solenoid, the integrated circuit card head initializer mechanism 100 might be activated by a linear solenoid and thus be mounted for slidable movement away and toward the card transfer path.

Figure 10A:
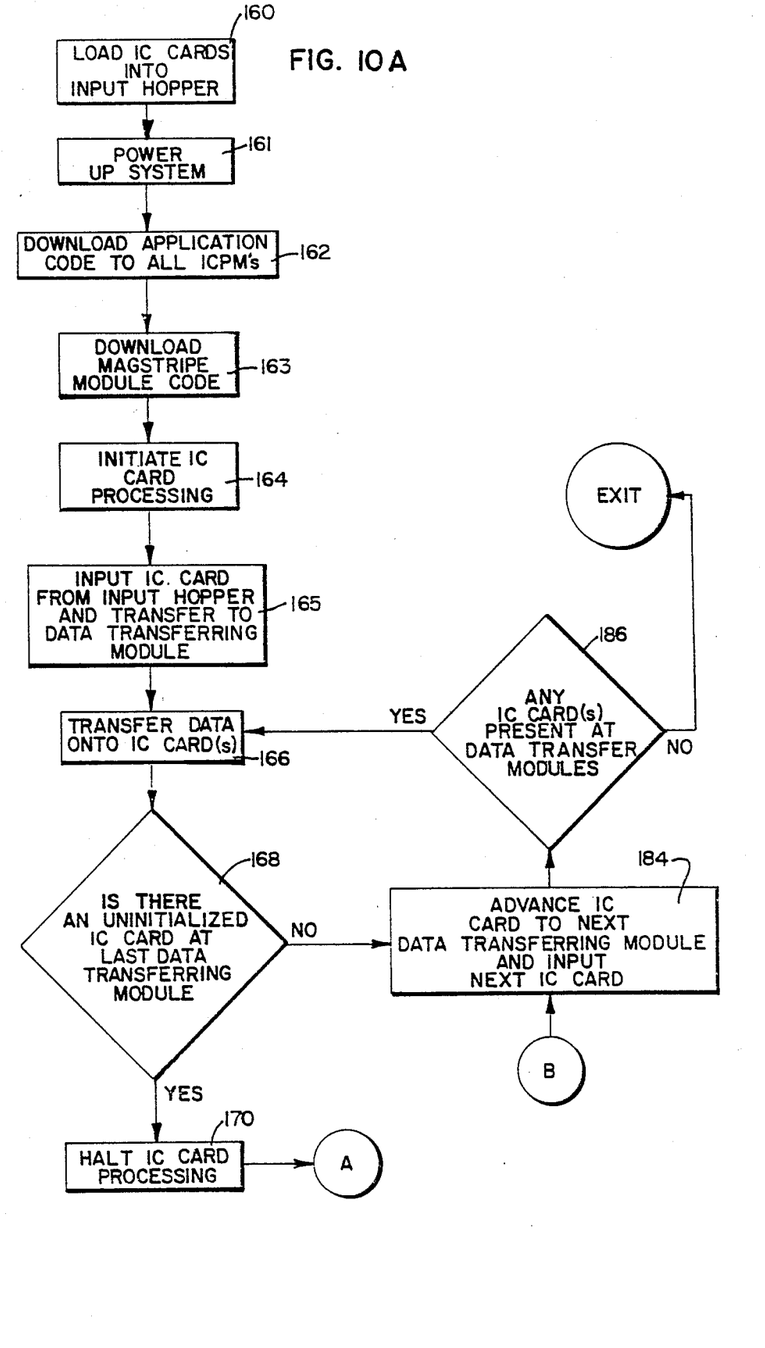
FIGS. 10A and 10B are logic flow diagram of system operation of an embodiment of the present invention.
Figure 10B:
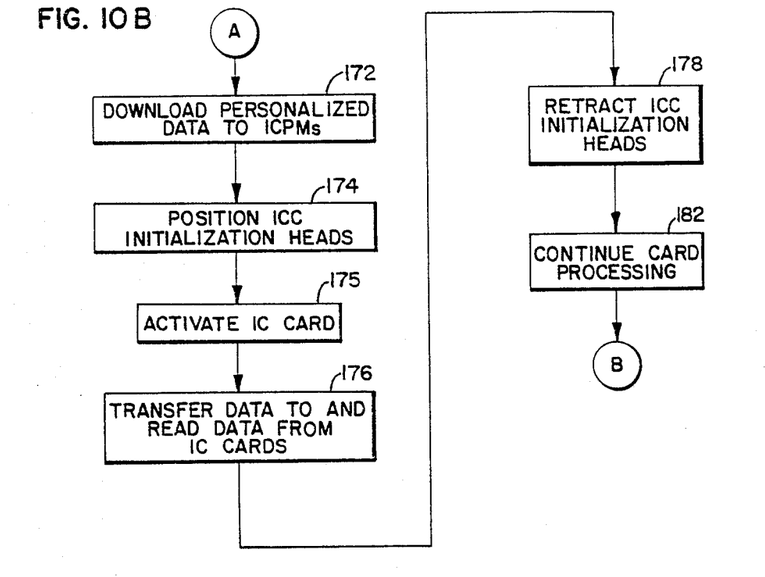

With reference to FIGS. 10A and 10B, one embodiment of a method of using the present invention will now be described. At 160, integrated circuit cards are loaded into the input hopper. At 161, the system is powered up. At 162, the application code associated with the particular application for which the cards are being initialized, is read in from disk storage media at the system controller 90 and downloaded from the system controller to the ICPMs. The application code is downloaded only once during any given run wherein cards are prepared for a particular application and on a particular vendor's cards. At 163, the code is downloaded to the magstripe module informing the magstripe module which lines, etc. are to be used for the magstripe encoding process. If no magstripe is present, this step is unnecessary. At 164, card processing is initiated. At 165, an integrated circuit card is input from the input hopper and transferred to the first module 64. At 166, data is downloaded from the system controller and transferred to the integrated circuit card using conventional methods such as embossing, magnetic stripe encoding, etc. At 168, a check is made if the unitialized card has reached the last module 64 having an associated ICPM 94. If the uninitialized card has reached the last such module, the card processing mode is halted at 170 and at 172 the card initialization process is started by downloading the personalized data for each card from the system controller 90 to the ICPMs 94. It will be appreciated that detection by the system controller 90 that the uninitialized card has reached the last such module might be accomplished by any one of several ways, such as by use of a photocell or other sensor along the card transfer path. At 174, the integrated circuit card initializer head mechanisms 100 are positioned so as to engage the contacts 84 of the integrated circuit cards 80. At 175, the integrated circuit cards 80 are activated by the ICPMs and at 176 the cards are initialized; i.e., data is transferred to and from the integrated circuits 82 of the cards. Upon completion of the initialization process, at 178 the integrated circuit card initialization head mechanisms 100 are retracted and the card initialization mode is halted. At 182, the card processing mode is initiated. At 184, the integrated circuit cards are transferred to the next adjacent module. At 186, a check is made if there are any more cards to be processed. At 166, data transfer begins. If there are not more cards in the input hopper, card processing is continued until the last card has been processed at the final station.

The throughput of the card processing system 40 is related to the required programming time of the integrated cards. A maximum throughput is obtained if there is no integrated circuit card initialization. The throughput is degraded by the amount of time it takes to initialize the integrated circuit cards. Initialization time may vary from several seconds to several minutes depending on the programming speed and the amount of data to be programmed. The equation for calculating throughput is as shown below:

a = ICC Personalizing time (seconds)
● Mechanical Setup Time
● Answer-to-Reset
● I/O Communication
● Programming Time
● Response Verification
b = ICC Programming Modules Installed
c = Maximum Card Throughput without ICC Programming
T = Throughput (Cards/Hour)

$$T = 3600/((a/b) + c) \text{ Cards/Hour}$$

It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. A card processing system used in processing integrated circuit (IC) cards having an integrated circuit including memory, the card processing system comprising:
   (a) a system controller means for controlling operation of the IC card processing system;
   (b) an IC card input hopper means for feeding IC cards;
   (c) a IC card output stacker means for receiving IC cards;
   (d) card transfer path means for transferring the IC cards from the input hopper means to the output stacker means;
   (e) a plurality of station means disposed adjacent the card transfer path means intermediate of the input hopper means and the output stacker means for transferring information to the IC cards by other than programming of the integrated circuit memory of the IC cards, the station means being electrically interconnected to the system controller;
   (f) a plurality of the station means including integrated circuit programming module (ICPM) means, the ICPM means including microprocessor and associated memory, for programming the integrated circuit memory of the IC cards, the ICPM means being electrically interconnected to the system controller means, the ICPM means of the card processing system programming in parallel a plurality of the IC cards; and
   (g) the system controller means including means for:
      (i) downloading application code to the ICPM means;
      (ii) transferring personalized data to the ICPM means;
      (iii) determining when an uninitialized IC card has reached the last station means containing ICPM means;
      (iv) transferring control to the ICPM means; and
      (v) maintaining the card processing system in an idle state while the ICPM means programs a plurality of the IC cards.

2. A card processing system used in processing integrated circuit (IC) cards having an integrated circuit including memory, the card processing system comprising:
   (a) a system controller means for controlling operation of the IC card processing system, the card processing system having an IC card processing mode and an IC card initializing mode;
   (b) IC card input hopper means for feeding IC cards;
   (c) output stacker means for receiving IC card;
   (d) card transfer path means for transferring the IC cards from the input hopper means to the output stacker means;
   (e) a plurality of station means disposed adjacent the card transfer path means for transferring information to the IC cards by other than programming of the integrated circuit memory of the IC cards while the card processing system is in the card processing mode;
   (f) a plurality of the station means including integrated circuit programming module (ICPM) means for programming the integrated circuit memory of the IC card while the card processing system is in the IC card initializing mode, the ICPM means being electrically interconnected to the system controller means and including microprocessor and associated memory means, the ICPM means of the card processing system programming in parallel a plurality of the IC cards while in the IC card initializing mode; and (g) the system controller means including means for switching the card processing system to the IC card initializing mode when an uninitialized IC card has been transferred to the last station along the card transfer path means which includes an ICPM means, and further includes means for switching the card processing system to the IC card processing mode upon completion of the initializing process.

3. A card processing system in accordance with claim 2, wherein the system controller downloads application data and personalized data to the ICPM means, the application data being downloaded upon start-up of the card processing system.

4. A system in accordance with claim 2, wherein the ICPM means includes initializing head means disposed adjacent the card transfer path means for making electrical contact with contacts of the IC cards.

5. A system in accordance with claim 4, wherein the initializing head means is pivotally mounted for pivotal movement between an initializing position and an uninitializing position.

6. A system in accordance with claim 5, wherein the initializing head means is pivoted by a rotary solenoid.

7. A method of processing integrated circuit (IC) cards having an integrated circuit including memory, the method comprising the steps of:

(a) sequentially feeding IC cards from an input hopper;

(b) transferring the IC cards along a predetermined card transfer path past a plurality of stations which transfer data onto the IC card by methods other than programming of the integrated circuit of the IC card; and (c) interrupting the card transfer process to initialize in parallel IC cards at a plurality of the stations with personalization data by programming the integrated circuit of the IC cards.

* * * * *

UNITED STATES PATENT AND TRADEMARK OFFICE
CERTIFICATE OF CORRECTION

PATENT NO. : 4,825,054
DATED : April 25, 1989
INVENTOR(S) : Rust et al.

It is certified that error appears in the above-identified patent and that said Letters Patent is hereby corrected as shown below:

Title page, OTHER PUBLICATIONS, "Away" should be --A way--.

Col. 1, lines 47 and 56, "strip" should be --stripe--.

Col. 2, line 18, "modlue" should be --module--.

Col. 2, line 55, "a" should be --an--.

Col. 2, line 67, "diagram" should be --diagrams--.

Col. 3, line 17, after "," insert --and--.

Col. 3, line 37, "applied" should be --applies--.

Col. 3, line 51, after "rear" insert --face--.

Col. 3, line 55, "strip" should be --stripe--.

Col. 5, line 18, "FIG." should be --FIGS.--.

Col. 5, line 21, "casuging" should be --causing--.

Col. 5, line 25, "intializer" should be --initializer--.

Col. 5, line 39, "mechanism" should be --mechanisms--.

Col. 5, line 39, after "is" insert --returned to the system controller 90. Card processing is--.

Col. 5, line 42, "intialization" should be --initialization--.

Col. 6, line 22, "typicaly" should be --typically--.

Col. 6, line 25, "date" should be --data--.

UNITED STATES PATENT AND TRADEMARK OFFICE
CERTIFICATE OF CORRECTION

PATENT NO. : 4,825,054

DATED : April 25, 1989

INVENTOR(S) : Rust et al.

It is certified that error appears in the above-identified patent and that said Letters Patent is hereby corrected as shown below:

Col. 6, line 26, after "etc." begin new paragraph.

Col. 6, line 35, "loded" should be --loaded--.

Col. 6, line 64, "single" should be --signal--.

Col. 7, line 14, "are" should be --for--.

Col. 7, line 26, "integrate" should be --integrated--.

Col. 7, line 45, "for" should be --from--.

Col. 9, line 10, "unitialized" should be --uninitialized--.

Col. 9, line 34, "not" should be --no--.

Col. 10, line 13, "a" should be --an--.

Col. 10, line 55, "card" should be --cards--.

Signed and Sealed this

Twenty-sixth Day of December, 1989

*Attest:*

JEFFREY M. SAMUELS

*Attesting Officer*   *Acting Commissioner of Patents and Trademarks*